(12) United States Patent
Meloche

(10) Patent No.: US 9,438,524 B2
(45) Date of Patent: Sep. 6, 2016

(54) SYSTEM AND METHOD FOR VERIFYING MULTIPROTOCOL LABEL SWITCHING CONTRACTS

(75) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 207 days.

(21) Appl. No.: 13/408,446

(22) Filed: Feb. 29, 2012

(65) Prior Publication Data
US 2013/0223223 A1 Aug. 29, 2013

(51) Int. Cl.
*H04L 12/833* (2013.01)
*H04L 12/813* (2013.01)

(52) U.S. Cl.
CPC .............. *H04L 47/31* (2013.01); *H04L 47/20* (2013.01)

(58) Field of Classification Search
CPC ....... H04L 47/10; H04L 47/20; H04L 47/30; H04L 47/31; H04L 47/326; H04L 47/525; H04L 49/30; H04L 49/254; H04L 49/351; H04L 49/3018; H04L 49/3027; H04L 12/14; H04L 12/28; H04L 12/56; H04L 12/5693; H04W 28/10
USPC .......................................... 370/229–235, 236
See application file for complete search history.

(56) References Cited

U.S. PATENT DOCUMENTS

| | | | | |
|---|---|---|---|---|
| 6,826,150 B1 * | 11/2004 | Bhattacharya | .......... | H04L 47/10 370/230 |
| 6,944,169 B1 | 9/2005 | Yoshizawa et al. | | |
| 8,400,919 B1 * | 3/2013 | Amdahl | .............. | H04L 47/2441 370/230.1 |
| 8,509,072 B2 * | 8/2013 | Lee | ....................... | H04L 43/028 370/230 |
| 8,797,867 B1 * | 8/2014 | Chen | ................... | H04L 41/5022 370/232 |

(Continued)

OTHER PUBLICATIONS

U.S. Appl. No. 13/401,060, filed Feb. 21, 2012, Jean Meloche.

*Primary Examiner* — Andrew Chriss
*Assistant Examiner* — Rasha Fayed
(74) *Attorney, Agent, or Firm* — Sheridan Ross P.C.

(57) ABSTRACT

Systems, methods, and non-transitory computer-readable storage media for verifying service contracts by measuring rates of out-of-contract traffic. The method is discussed in terms of a system implementing the method. The system determines, based on packet markings, a number of network packets that are classified as out-of-contract by a network device, wherein the packet markings indicate a classification associated with respective network packets. The packet markings can be Differentiated Services Code Point markings Moreover, the classification associated with respective network packets can include a class of service and at least one of an in-contract status and an out-of-contract status. Next, the system measures network packets sent to the network device. Finally, the system determines how the network device is configured to classify incoming packets based on the number of network packets that are classified as out-of-contract by the network device and the network packets sent to the network device.

20 Claims, 5 Drawing Sheets

(56) References Cited

U.S. PATENT DOCUMENTS

| | | | |
|---|---|---|---|
| 2002/0031091 A1* | 3/2002 | van Everdingen | H04L 47/10 370/236 |
| 2002/0097677 A1* | 7/2002 | Hoar | H04L 47/10 370/230 |
| 2003/0204619 A1* | 10/2003 | Bays | H04L 12/2697 709/238 |
| 2005/0053009 A1 | 3/2005 | Denby et al. | |
| 2005/0276219 A1* | 12/2005 | Wang | H04L 12/14 370/229 |
| 2006/0239188 A1* | 10/2006 | Weiss | H04L 47/10 370/229 |
| 2007/0076605 A1 | 4/2007 | Cidon et al. | |
| 2007/0133419 A1* | 6/2007 | Segel | H04L 47/10 370/236 |
| 2008/0123660 A1* | 5/2008 | Sammour | H04L 47/10 370/395.21 |
| 2008/0175148 A1* | 7/2008 | Todd | H04N 21/2389 370/235 |
| 2009/0067332 A1* | 3/2009 | Iwakiri | H04L 47/10 370/235 |
| 2009/0238192 A1* | 9/2009 | Dolganow | H04L 47/10 370/400 |
| 2009/0268622 A1 | 10/2009 | Blum et al. | |
| 2011/0075560 A1* | 3/2011 | DelRegno | H04L 47/10 370/235 |
| 2011/0103377 A1* | 5/2011 | Hua | H04L 65/1053 370/352 |
| 2011/0211449 A1* | 9/2011 | Attar | H04L 47/34 370/235 |
| 2011/0261696 A1* | 10/2011 | Crisan | H04L 45/00 370/235 |
| 2012/0250505 A1* | 10/2012 | Brolin | H04L 47/17 370/230.1 |
| 2013/0100810 A1* | 4/2013 | Slothouber | H04L 43/0882 370/235 |
| 2013/0107703 A1* | 5/2013 | Cherian | H04W 48/12 370/230 |
| 2013/0163594 A1* | 6/2013 | Sharma | H04L 45/64 370/392 |

* cited by examiner

FIG. 4

| COS VALUE | DSCP VALUE (IN CONTRACT) | DSCP VALUE (OUT OF CONTRACT) |
|---|---|---|
| 1 | 46 | |
| 2 | 26 | 28 |
| 3 | 18 | 20 |

SYSTEM AND METHOD FOR VERIFYING MULTIPROTOCOL LABEL SWITCHING CONTRACTS

RELATED APPLICATIONS

The present application is related to U.S. patent application Ser. No. 13/401,060, filed Feb. 21, 2012, the contents of which are incorporated herein in their entirety.

BACKGROUND

1. Technical Field

The present disclosure relates to Multiprotocol Label Switching and more specifically to verification of Multiprotocol Label Switching contracts by measuring rates of out-of-contract traffic.

2. Introduction

Service Level Agreements (SLA) typically allocate parts of an overall circuit capacity to various Classes of Service (CoSs). For example, in a 40 mbps circuit, an SLA may include 4 mbps in CoS 1, 10 mbps in CoS 2, and 5 mbps in CoS 3. These allocations are called Committed Data Rates (CDRs), referring to the data transfer rates that an Internet Service Provider (ISP) guarantees the virtual circuit will carry.

Routers in the virtual circuit are generally configured to process traffic according to the specified CDRs. Routers are also configured to process excess traffic according to various rules. These rules often depend on the CoS specified for the particular traffic. For example, CoS 1 traffic is given absolute priority for up to 1 mbps, but CoS 1 traffic in excess of 1 mbps is simply discarded. By contrast, excess traffic for other CoSs is not generally dropped, but classified as out-of-contract (or "Drop Eligible"), and forwarded if there is sufficient overall capacity in the virtual circuit.

Because these rules affect the processing of traffic between the customer-edge (CE) router and the provider-edge (PE) router, it is very important that routers are properly configured to apply the rules in accordance with the SLA. Yet it can be extremely difficult to verify that routers are properly configured to process traffic according to the SLA. For example, the customer can schedule time-consuming collaborations with the ISP to verify that the CE router and the PE router are configured correctly. Here, the customer stress tests the CE-PE link while an ISP technician logged into the CE router looks at real-time reports of classifications on the CE router. This can be an expensive and time-consuming process.

A related verification can also be performed by collecting and analyzing flow statistics, which can be used to determine what information is sent to the CE router. However, flow statistics do not present a complete picture, as flow statistics do not provide information regarding how the CE router classifies incoming packets. Thus, without additional information, it is very difficult to determine whether the CE router is improperly classifying packets as out-of-contract, in contravention to the SLA.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to efficiently and reliably verify service contracts by measuring rates of out-of-contract traffic. For example, these approaches can be used to determine how incoming packets are classified by a customer-edge router. Moreover, this information can be used in conjunction with flow data from the Multiprotocol Label Switching (MPLS) router, which provides information regarding the rate at which packets are sent to the customer-edge router, to determine whether the customer-edge router is configured properly, marking packets as out-of-contract only when the specified committed data rate is exceeded. This information can also be used to configure the customer-edge router and/or calibrate the service contract with the provider.

Disclosed are systems, methods, and non-transitory computer-readable storage media for verifying service contracts by measuring rates of out-of-contract traffic. The method is discussed in terms of a system implementing the method. The system determines, based on packet markings, a number of network packets that are classified as out-of-contract by a network device, wherein the packet markings indicate a classification associated with respective network packets. The packet markings can be, for example, Differentiated Services Code Point markings. Moreover, the packet markings can indicate a class of service and an in-contract or out-of-contract status assigned to respective network packets. Here, the system can look at the markings on packets to identify packets classified as out-of-contract by the network device, and measure the amount of traffic in excess of the SLA allocation.

Next, the system measures network packets sent to the network device. For example, the system can collect flow statistics to determine the number and/or rate of network packets sent to the network device. The system can also inspect flow statistics collected on another device, such as a router, to determine the number and/or rate of network packets sent to the network device. In one aspect, the system analyzes flow data from the MPLS router to determine the rate at which video packets are sent to the customer-edge router.

Finally, the system determines how the network device is configured to classify incoming packets based on the number of network packets that are classified as out-of-contract by the network device and the network packets sent to the network device. The system can then verify that the network device is configured to classify incoming packets according to the SLA. Thus, the system can confirm both the amount of traffic in excess of an SLA allocation and the configuration of the network device. This information can then be used, for example, to configure the network device and/or calibrate the service contract with the provider.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an exemplary Class of Service to Differentiated Services Code Point mapping table.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for verifying service contracts. A system, method and non-transitory computer-readable media are disclosed which verify service contracts by measuring rates of out-of-contract traffic. A brief introductory description of a basic general purpose system or computing device in FIG. 1, which can be employed to practice the concepts, is disclosed herein. A detailed description of verifying service contracts by measuring rates of out-of-contract traffic will then follow, accompanied by variations and examples. These variations shall be discussed herein as the various embodiments are set forth. The disclosure now turns to FIG. 1.

Figure 1:
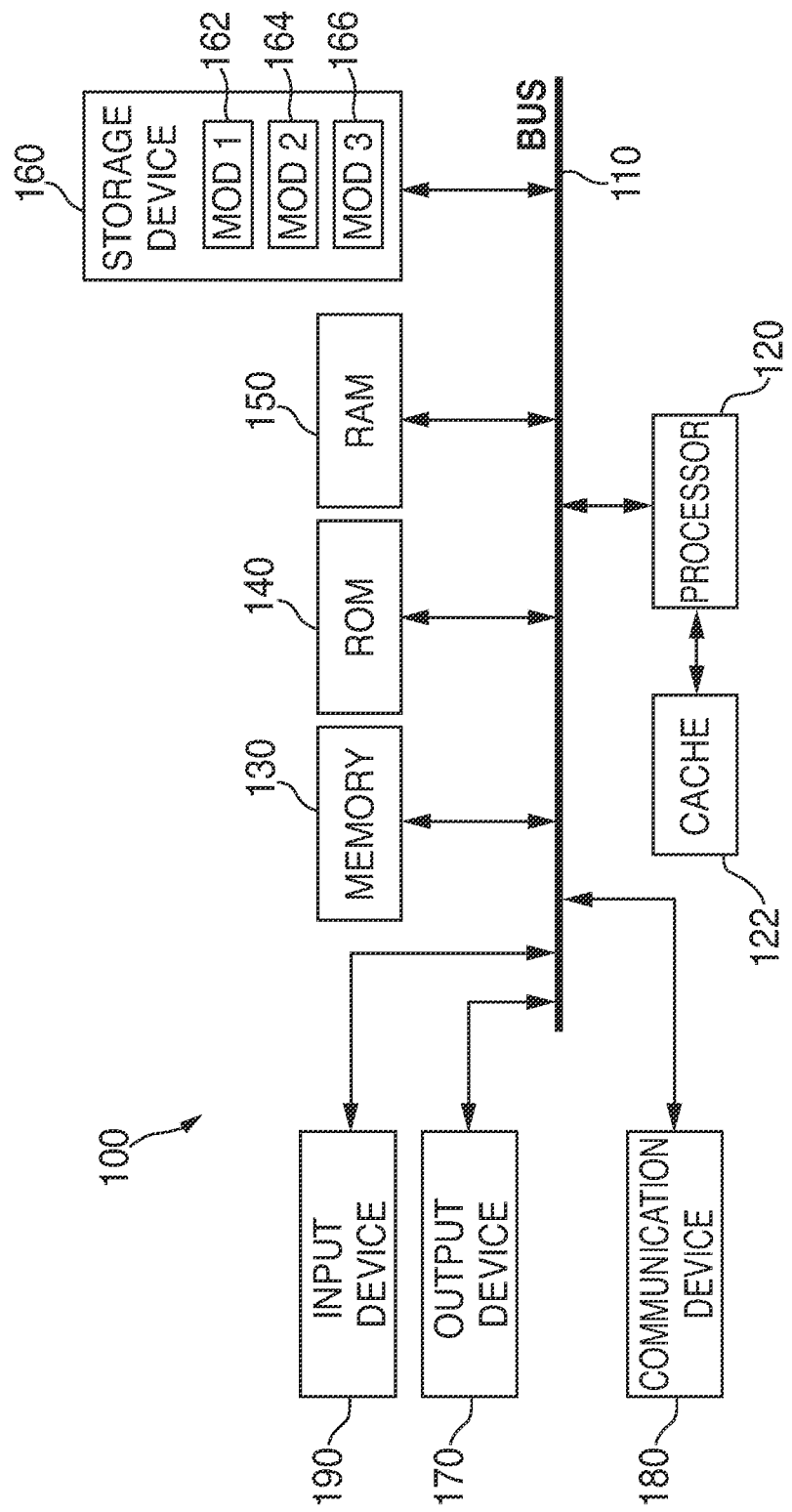
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
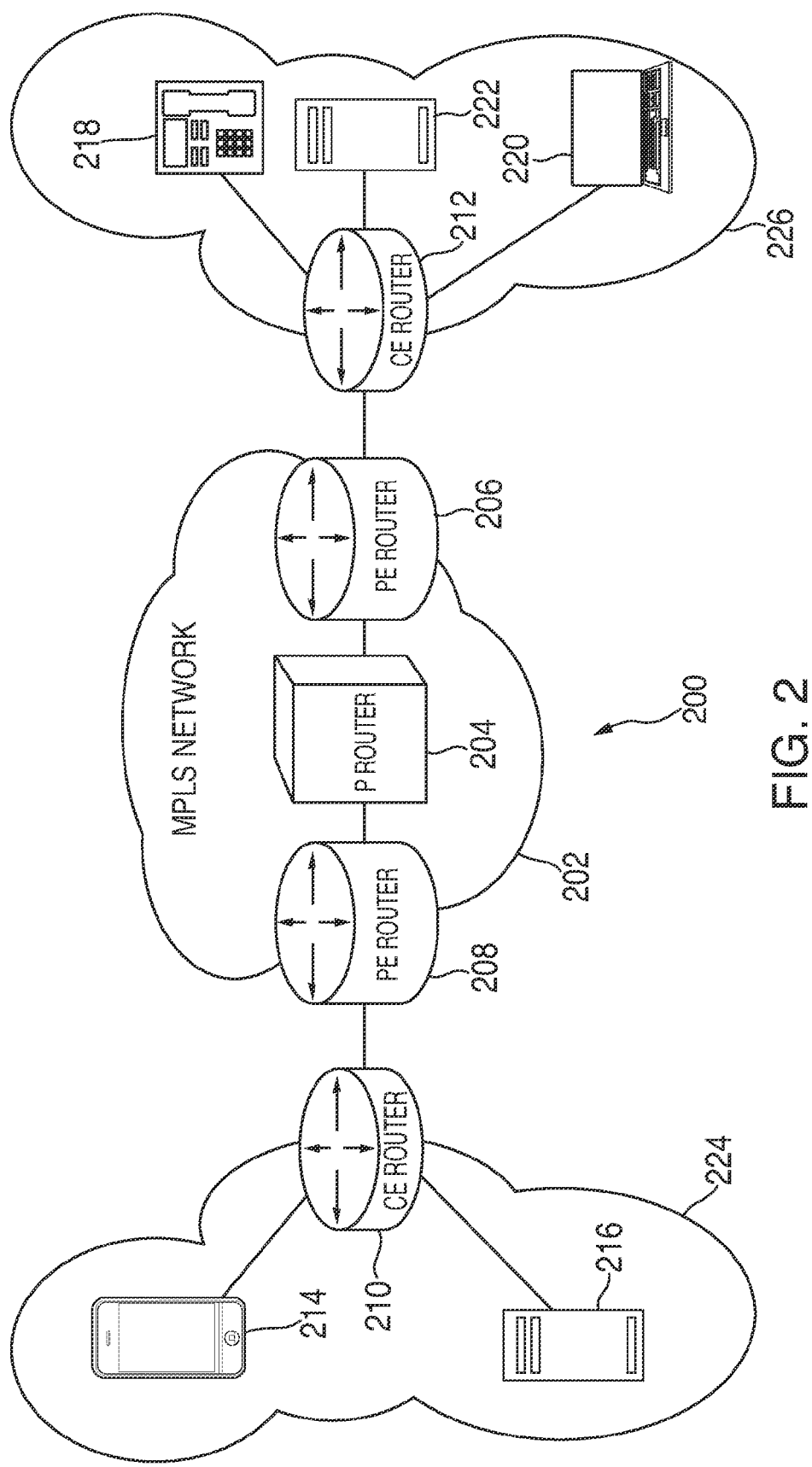
FIG. 2 illustrates an exemplary Multiprotocol Label Switching network infrastructure.

Having disclosed some components of a computing system, the disclosure now turns to FIG. 2, which illustrates an exemplary Multiprotocol Label Switching network infrastructure 200. The MPLS Network 202 is a network configured to use Multiprotocol Label Switching (MPLS). MPLS is a mechanism for directing data based on packet labels rather than network addresses. MPLS allows one to create virtual circuits through the Internet. With MPLS, each packet is labeled with an MPLS value, which specifies the packet's MPLS path, and each router has a table indicating how to handle packets with specific labels. Routers can then make packet-forwarding decisions based on the contents of the packet's label. Thus, routers can direct data without examining the packet header, which can be terribly inefficient.

The MPLS Network 202 includes a provider router 204 and two provider edge routers 206, 208. The provider router 204 communicates with the provider edge routers 206, 208, which communicate with the customer edge routers 210, 212. The customer edge router 210 sits at the edge of the network 224, which can include one or more networks. The customer-edge router 212 sits at the edge of the network 226, which similarly can include one or more networks. The networks 224 and 226 can include a public network, such as the Internet, but can also include a private or quasi-private network, such as an intranet, a home network, a virtual private network (VPN), a shared collaboration network between separate entities, etc. The network 224 includes a mobile phone 214 and a server 216, which are configured to communicate with the customer-edge router 210. The network 226 includes a Voice-over-IP (VoIP) phone 218, a computer 220, and a Service Level Agreement (SLA) monitor 222. The networks 224 and 226 can also include one or more additional routers, and one or more additional network devices. The network devices can include virtually any device with networking capabilities, such as computers, phones, video game consoles, conferencing systems, network media players, etc.

The mobile phone 214, server 216, VoIP phone 218, computer 220, and/or SLA monitor 222 can include a software module for monitoring network information and verifying service contracts. Similarly, the provider-edge routers 206, 208 and/or the provider router 204 can include a software module for monitoring network information and/or verifying service contracts. For example, the provider-edge routers 206, 208 can be configured to serve as SLA monitors. In one embodiment, the server 216 is an SLA monitor configured to monitor the customer-edge router 210 and verify that the customer-edge router 210 is configured to classify incoming packets according to an SLA. Here, the server 216 can measure the number of network packets that are classified as out-of-contract by the customer-edge router 210, based on packet markings. The server 216 can then measure network packets sent to the customer-edge router 210 and determine how the customer-edge router 210 is configured to classify incoming packets based on the number of network packets that are classified as out-of-contract by the customer-edge router 210 and the network packets sent to the customer-edge router 210. The packet markings indicate how packets are classified by the customer-edge router 210. The packet markings can be, for example, Differentiated Services Code Point (DSCP) markings. The customer-edge router 210 can classify packets according to a Class of Service (CoS) and/or an in-contract or out-of-contract status.

In another embodiment, the SLA monitor 222 is configured to monitor the customer-edge router 212 and verify that the customer-edge router 212 is configured to classify incoming packets according to an SLA. In this aspect, the SLA monitor 222 measures the number of network packets that are classified as out-of-contract by the customer-edge router 212, based on packet markings. The SLA monitor 222 then measures network packets sent to the customer-edge router 212 and determines how the customer-edge router 212 is configured to classify incoming packets, based on the number of network packets that are classified as out-of-contract by the customer-edge router 212 and the network packets sent to the customer-edge router 212.

Figure 3:
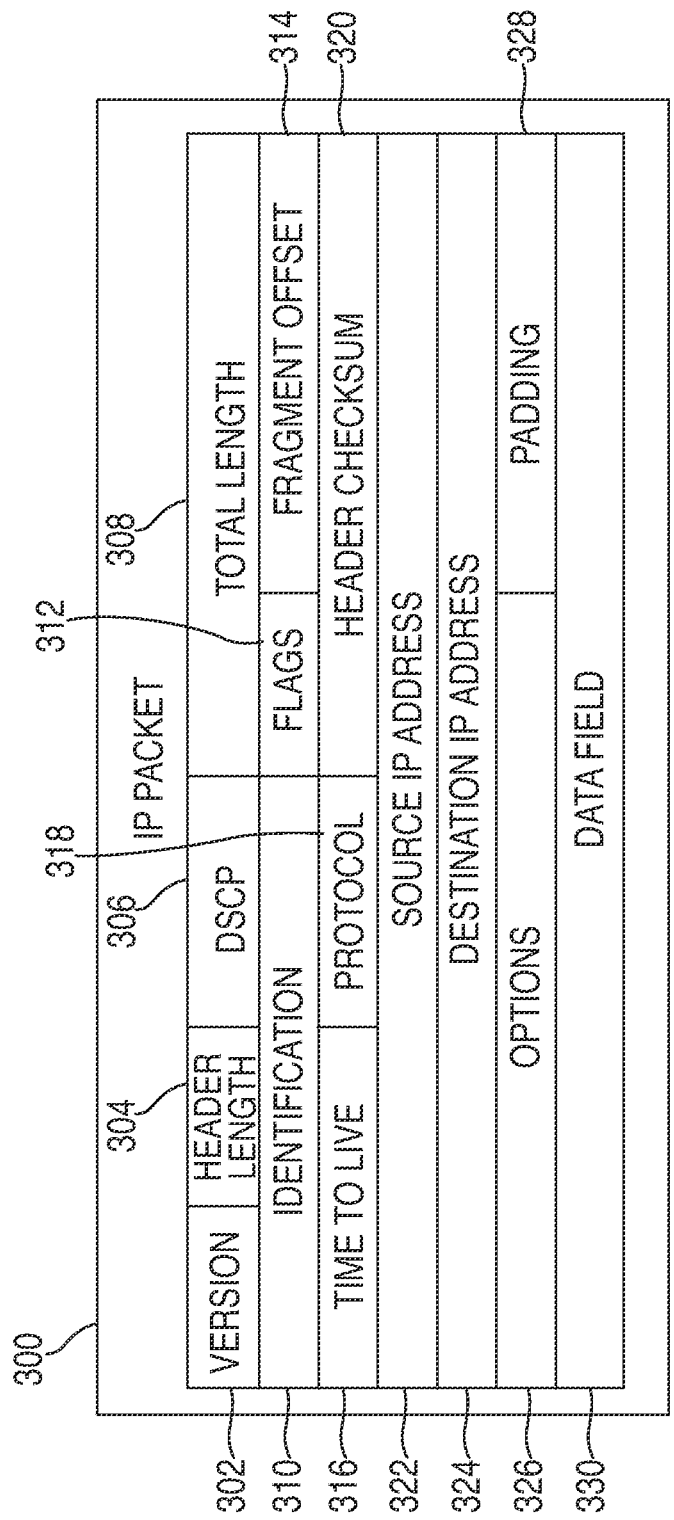
FIG. 3 illustrates an example of an Internet Protocol packet.

FIG. 3 illustrates an example of an Internet Protocol packet 300. The first field is the Version field 302, which indicates the format of the internet header. FIG. 3 describes version 4. The Header Length field 304 indicates the length of the internet header in 32-bit words. The Type of Service (ToS) field 306 specifies various aspects of delivery quality. To this end, the ToS field 306 includes parameters defining the quality of service desired. These parameters define the datagrams priority, which the ToS field 306 can use to request a route for low-delay, high-throughput, or highly-reliable service. In this example, the ToS field 306 is marked with a Differentiated Services Code Point (DSCP). DSCP is a field in an IP packet that enables different levels of service to be assigned to network traffic. Specifically, DSCP identifies a particular per-hop behavior (PHB) to be applied to a marked packet. The marked packet is then forwarded according to the PHB associated with the DSCP. Typically, the levels of service are defined by a Service Level Agreement (SLA), which specifies the forwarding service that a customer will receive.

The Total Length field 308 is the total length of the datagram measured in octets. The Identification field 310 contains an identification tag assigned by the sender to help reconstruct the packet from several fragments. The Flags field 312 contains various control flags. Specifically, the Flags field 312 includes a flag that specifies whether the packet is permitted to be fragmented or not, and a flag specifying whether more fragments of a packet follow. The Fragment Offset field 314 identifies the position of a fragment within the original packet.

The Time-to-Live (TTL) field 316 indicates the number of hops the packet is allowed to traverse across the network before it expires. For example, a packet with a TTL of 8 will be allowed to pass 8 routers or nodes across the network to get to its destination before it is discarded. The Protocol field 318 indicates which process should receive the contents of the data field. For example, the IP protocol field values 1, 6, and 17 indicate Internet Control Message Protocol (ICMP), Transmission Control Protocol (TCP), and User Datagram Protocol (UDP), respectively. The Header Checksum 320 is a value used in error detection.

The Source IP Address 322 indicates the source address and the Destination IP Address 324 indicates the destination address. The Options field 326 can be used to add optional flags for testing, debugging, and security. The Options field 326 can include an Option-Type octet, an Option-Length octet and a variable number of Option-data octets. The Padding 328 can be added as a filler to ensure that the data starts on a 32 bit boundary. Finally, the packet includes a Data Field 330, which contains the actual data that the packet is delivering to the destination.

Although the header in the IP packet 300 is shown as an IP version 4 packet header, those of skill in the art can understand that the principles disclosed herein can be applied to other versions, such as an IP version 6 header.

FIG. 4 illustrates an exemplary Class of Service to Differentiated Services Code Point mapping table 400. Service Level Agreements (SLA) typically allocate parts of an overall circuit capacity to various Classes of Service (CoS). For example, an SLA can include 4 mbps in CoS 1 (audio), 10 mbps in CoS 2 (video), and 5 mbps in CoS 3 (data) in an overall 40 mbps circuit. These allocations are called Committed Data Rates (CDRs).

Typically, CoS 1 traffic is given absolute priority up to 1 mbps, but CoS 1 traffic in excess of 1 mbps is simply dropped. The other CoSs, however, are generally treated different. When the queue for CoS 1 packets is empty, the router will drain the queues for the other CoSs at a rate proportional to their CDR. In the previous example, the router would drain the CoS 2 queue twice as fast as it would drain the CoS 3 queue, resulting in better performance for packets in CoS 2 than CoS 3.

The CoSs other than CoS 1 are also treated differently with respect to excess traffic. Instead of dropping excess packets, the router classifies them as Out-of-Contract (OOC), or "drop eligible," and forward the excess packets if the overall capacity is sufficient.

As previously mentioned, the DSCP field in an IP packet enables different levels of service to be assigned to network traffic. Here, the IP packet is marked with a DSCP marking that reflects the packet's CoS and in-contract or out-of-contract status. Because different DSCP markings are used when packets are classified as in-contract and out-of-contract, the DSCP markings can be used to identify out-of-contract traffic and/or measure the amount of CoS 2 and CoS 3 traffic in excess of the SLA allocation.

The mapping table 400 maps a Class of Service (CoS) value (402) to a packet's In-contract DSCP value (404) and Out-of-Contract DSCP value (406). Accordingly, the mapping table 400 can be used to identify and/or measure out-of-contract traffic based on DSCP markings As illustrated in FIG. 4, CoS 1 (408) traffic has a DSCP value of 46 (410) for in-contract traffic. CoS 1 (408) traffic in excess of the SLA allocation is dropped, as previously mentioned, and therefore does not have a DSCP value for out-of-contract traffic (412). CoS 2 (414) traffic has a DSCP value of 26 (416) for in-contract traffic and 28 (418) for out-of-contract traffic. Finally, CoS 3 (420) traffic has a DSCP value of 18 (422) for in-contract traffic and 20 (424) for out-of-contract traffic.

The values shown in the mapping table 400 are provided for illustration purposes. Those of skill in the art will understand that the mapping table 400 can include additional CoS values and/or different DSCP values for in-contract and/or out-of-contract traffic.

Figure 5:
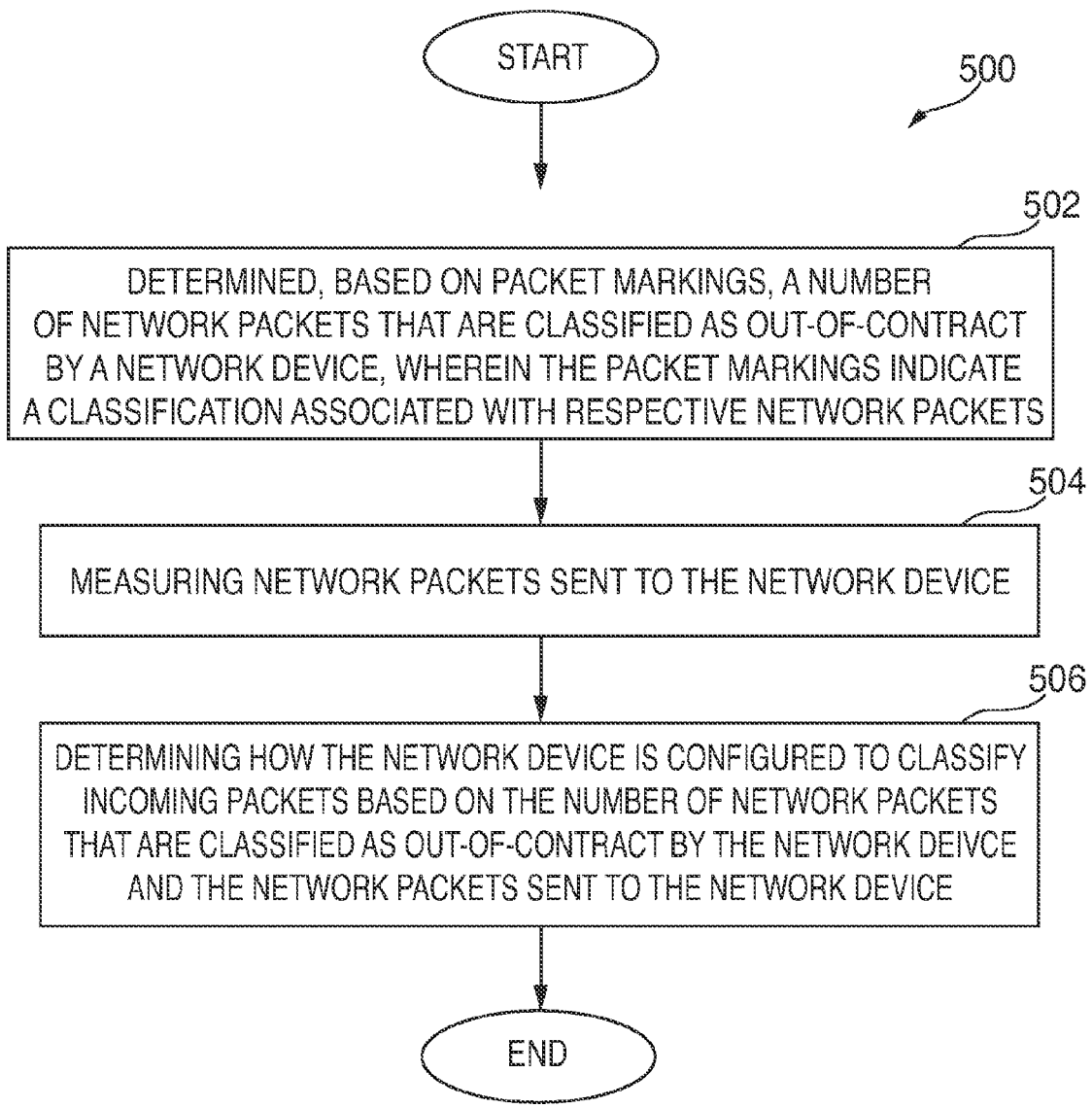
FIG. 5 illustrates an exemplary method embodiment.

Having disclosed some basic system components and concepts, the disclosure now turns to the exemplary method embodiment shown in FIG. 5. For the sake of clarity, the method is discussed in terms of an exemplary system 100, as shown in FIG. 1, configured to practice the method. The steps outlined herein are exemplary and can be implemented in any combination thereof, including combinations that exclude, add, or modify certain steps.

In FIG. 5, the system 100 determines, based on packet markings, a number of network packets that are classified as out-of-contract by a network device, wherein the packet markings indicate a classification associated with respective network packets (502). The packet markings can be, for example, DSCP markings. The packet markings can indicate a class of service and an in-contract or out-of-contract status assigned to respective network packets. Here, the system 100 can look at the DSCP markings on packets to identify packets classified as out-of-contract by the network device. The system 100 can then measure the amount of traffic in excess of the SLA allocation.

The system 100 can send a test to the network device to determine how the network device classifies incoming packets. For example, the system 100 can probe DSCP markings across the network to detect the amount of traffic that is in-contract and out-of-contract over time. In one embodiment, the system 100 sends a number of probes (e.g., video, audio, data, etc.) to the network device, with a TTL set so as to elicit an ICMP TTL exceeded response from the network device. The ICMP TTL exceeded response will reveal the packet's classification made by the network device. The probes can be sent in perpetuity to obtain the rate of out-of-contract packets over time. In one embodiment, the system 100 sends video probes in perpetuity to get the rate of out-of-contract video over time. Moreover, the probes can be sent at a slow rate so as to not exceed a limiting rate imposed on the network device for the generation of such responses. For example, a router can be configured to limit the rate at which it generates ICMP responses, dropping any responses in excess. Accordingly, the probes can be sent at a rate below the limiting rate configured for the router.

Next, the system 100 measures network packets sent to the network device (504). For example, the system 100 can collect flow statistics to determine the number and/or rate of network packets sent to the network device. The system 100 can also inspect flow statistics collected on another device, such as a router, a server, an SLA monitor, etc., to determine the number and/or rate of network packets sent to the network device. In one aspect, the system 100 inspects flow statistics collected on the site MPLS router to measure the number of network packets sent to the customer-edge router connected to the MPLS router. The flow data from the MPLS router can provide measurements regarding the rate at which packets (e.g., audio packets, video packets, data packets, etc.) are sent to the network device.

Finally, the system 100 determines how the network device is configured to classify incoming packets based on the number of network packets that are classified as out-of-contract by the network device and the network packets sent to the network device (506). The system 100 can then verify that the network device is configured to classify incoming packets according to the SLA. Thus, the system 100 can confirm both the amount of traffic in excess of an SLA allocation and the configuration of the network device. This information can then be used, for example, to calibrate the SLA with the service provider.

In one embodiment, the system 100 sends probes to the network device configured to elicit error responses from the network device. The system 100 then analyzes the error responses to identify the classifications made by the network device (e.g., in-contract and out-of-contract classification). The system 100 also uses flow data to determine the amount of traffic sent to the network device. The system 100 then verifies, based on the identified classifications and the amount of traffic, that the network device is configured to mark packets as out-of-contract only when a specified threshold is exceeded. The specified threshold can be, for example, a committed data rate. To obtain a value beyond the committed data rate, the system 100 can also inject additional traffic in the probes. For example, when sending video probes, the system 100 can inject video traffic in addition to the background video traffic in order to exceed the committed data rate for video.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to different packet headers and classification markings. Those skilled in the art will readily recognize various modifications and changes that may be made to the principles described herein without following the example embodiments and applications illustrated and described herein, and without departing from the spirit and scope of the disclosure.

I claim:

1. A method comprising:
sending, during a measuring period, a plurality of probes from a first node in a network to a second node in the network, the plurality of probes being configured to elicit respective error responses from the second node;
receiving, at the first node, the respective error responses from the second node, the respective error responses being marked by the second node with respective differentiated service code point values indicating respective classes of service and respective out-of-contract statuses;
based on the respective differentiated service code point values and a table that maps each predetermined differentiated service code point value to a particular class of service and an out-of-contract status, determining, by the first node, a number of packets in the respective error responses that are classified by the second node as out-of-contract for a class of service during the measuring period;
measuring a total number of probes sent to the second node during the measuring period;
verifying whether the second node is configured to classify incoming packets in accordance with a service level agreement for the class of service based on the number of packets that are classified by the second node as out-of-contract for the class of service and the total number of probes sent to the second node; and
based on the verification, performing one or more of configuring the second node to classify packets according to the service level agreement and/or calibrating the service level agreement.

2. The method of claim 1, wherein the first node is at least one of a router or a service level agreement monitor.

3. The method of claim 1, wherein each of the plurality of differentiated services code point values is included in a differentiated services code point field in a header of each incoming packet.

4. The method of claim 1, wherein each of the plurality of differentiated service code point values indicates a corresponding class of service and one of an in-contract status or an out-of-contract status.

5. The method of claim 1, wherein measuring the total number of probes comprises measuring a rate of network packets sent to the second node.

6. The method of claim 1, further comprising:
measuring rates of out-of-contract traffic; and
verifying a multiprotocol label switching service contract based on the rates of out-of-contract traffic.

7. The method of claim 1, further comprising:
analyzing the respective error responses to identify a classification value generated by the second node;
using flow data from the first node to determine a rate of traffic sent to the second node; and
based on the classification value and the rate of traffic, verifying that the second node is configured to mark packets as out-of-contract only when a specified threshold is exceeded.

8. The method of claim 1, wherein each of the plurality of probes is configured with a time-to-live value that exceeds an expiration threshold associated with the second node.

9. The method of claim 1, wherein each of the respective error responses comprises a time exceeded message.

10. The method of claim 1, wherein the plurality of probes is sent to the second node at a rate below a limiting rate set on the second node for generating error messages.

11. The method of claim 7, wherein the specified threshold comprises a committed data rate.

12. The method of claim 7, further comprising sending an amount of traffic over the specified threshold to the second node.

13. A system comprising:
a processor; and
a computer-readable medium storing instructions which, when executed by the processor, cause the processor to perform operations comprising:
sending, during a measuring period, a plurality of probes from a first node in a network to a second node in the network, the plurality of probes being configured to elicit respective error responses from the second node;
receiving, at the first node, the respective error responses from the second node, the respective error responses being marked by the second node with respective differentiated service code point values indicating respective classes of service and respective out-of-contract statuses;
based on the respective differentiated service code point values and a table that maps each predetermined differentiated service code point value to a particular class of service and an out-of-contract status, determining, by the first node, a number of network packets in the respective error responses that are classified by the second node as out-of-contract during the measuring period;
measuring a total number of probes sent to the second node during the measuring period; verifying whether the second node is configured to classify incoming packets in accordance with a service level agreement for the class of service based on the number of network packets that are classified by the second node as out-of-contract for the class of service and the total number of probes sent to the second node; and
based on the verification, performing one or more of configuring the second node to classify packets according to the service level agreement and/or calibrating the service level agreement.

14. The system of claim 13, the computer-readable medium storing additional instructions which, when executed by the processor, cause the processor to perform further operations comprising:
analyzing the respective error responses to identify a classification value generated by the network node;
using flow data from the first node to determine a rate of traffic sent to the second node; and
based on the classification value and the rate of traffic, verifying that the second node is configured to mark packets as out-of-contract only when a specified threshold is exceeded.

15. The system of claim 13, wherein each of the plurality of differentiated services code point values is included in a differentiated services code point field in a header of each incoming packet.

16. The system of claim 13, wherein each of the differentiated services code point values indicates a corresponding class of service and one of an in-contract status or an out-of-contract status.

17. A computer-readable storage device storing instructions which, when executed by a processor, cause the processor to perform operations comprising:
sending, during a measuring period, a plurality of probes from a first node in a network to a second node in the network, the plurality of probes being configured to elicit respective error responses from the second node;
receiving, at the first node, the respective error responses from the second node, the respective error responses being marked by the second node with respective differentiated service code point values indicating respective classes of service and respective out-of-contract statuses;
based on the respective differentiated service code point values and a table that maps each predetermined differentiated service code point value to a particular class of service and an out-of-contract status, determining by the first node, a number of packets in the respective error responses that are classified by the second node as out-of-contract for a class of service during the measuring period;
measuring a total number of probes sent to the second node during the measuring period; verifying whether the second node is configured to classify incoming packets in accordance with a service level agreement for the class of service based on the number of network packets that are classified by the second node as out-of-contract for the class of service and the total number of probes sent to the second node; and
based on the verification, performing one or more of configuring the second node to classify packets according to the service level agreement and/or calibrating the service level agreement.

18. The computer-readable storage device of claim 17, storing additional instructions which, when executed by the processor, cause the processor to perform further operations comprising verifying that the second node is configured to classify incoming packets according to the service level agreement.

19. The computer-readable storage device of claim 17, wherein the first node is one of a router or a service level agreement monitor.

20. The system of claim 13, wherein the first node is at least one of a router or a service level agreement monitor.

* * * * *

UNITED STATES PATENT AND TRADEMARK OFFICE
CERTIFICATE OF CORRECTION

PATENT NO. : 9,438,524 B2  
APPLICATION NO. : 13/408446  
DATED : September 6, 2016  
INVENTOR(S) : Jean Meloche Page 1 of 1

It is certified that error appears in the above-identified patent and that said Letters Patent is hereby corrected as shown below:

In the Claims

At Column 12, Line 46, Claim 17, please delete the word "network" therein.

Signed and Sealed this  
Seventh Day of February, 2017

Michelle K. Lee  
*Director of the United States Patent and Trademark Office*